United States Patent
Itani

(10) Patent No.: US 8,368,811 B2
(45) Date of Patent: Feb. 5, 2013

(54) REPRODUCING APPARATUS

(75) Inventor: Tetsuya Itani, Nara (JP)

(73) Assignee: Panasonic Corporation, Osaka (JP)

( * ) Notice: Subject to any disclaimer, the term of this patent is extended or adjusted under 35 U.S.C. 154(b) by 143 days.

(21) Appl. No.: 13/012,893

(22) Filed: Jan. 25, 2011

(65) Prior Publication Data
US 2011/0211112 A1 Sep. 1, 2011

(30) Foreign Application Priority Data

Jan. 29, 2010 (JP) .................................. 2010-018156

(51) Int. Cl.
*H04N 7/00* (2011.01)
*H04N 11/00* (2006.01)
*H04N 9/475* (2006.01)
*H03L 7/00* (2006.01)

(52) U.S. Cl. ........ 348/515; 348/738; 348/484; 348/552; 348/547; 386/231

(58) Field of Classification Search .................. 348/515, 348/736, 738, 473, 484, 552, 524, 536–537, 348/547; 386/231
See application file for complete search history.

(56) References Cited

U.S. PATENT DOCUMENTS

| | | | |
|---|---|---|---|
| 7,283,566 B2 * | 10/2007 | Siemens et al. | 370/486 |
| 7,418,240 B2 * | 8/2008 | Hsu et al. | 455/67.13 |
| 8,063,986 B2 * | 11/2011 | Wang | 348/515 |
| 8,194,186 B2 * | 6/2012 | Kouyama | 348/515 |
| 2004/0080671 A1 * | 4/2004 | Siemens et al. | 348/473 |
| 2004/0252235 A1 * | 12/2004 | Ejima | 348/515 |
| 2008/0024661 A1 * | 1/2008 | Tung | 348/537 |
| 2008/0061854 A1 * | 3/2008 | Tung et al. | 327/291 |
| 2008/0122977 A1 * | 5/2008 | Miyamoto | 348/537 |
| 2008/0298532 A1 * | 12/2008 | Wang | 375/376 |
| 2009/0086089 A1 * | 4/2009 | Matsui et al. | 348/441 |
| 2009/0115897 A1 | 5/2009 | Yamasaki et al. | |
| 2009/0167366 A1 * | 7/2009 | Wang | 327/105 |
| 2009/0257453 A1 * | 10/2009 | Yanagisawa et al. | 370/480 |
| 2009/0268091 A1 * | 10/2009 | Kouyama | 348/515 |
| 2010/0189104 A1 * | 7/2010 | Ichimura | 370/389 |

FOREIGN PATENT DOCUMENTS

| | | |
|---|---|---|
| JP | 2009-105889 | 5/2009 |
| JP | 2010-061774 A | 3/2010 |

\* cited by examiner

*Primary Examiner* — Brian Yenke

(74) *Attorney, Agent, or Firm* — Renner, Otto, Boisselle & Sklar, LLP

(57) ABSTRACT

According to the present invention, the sound quality of an apparatus having HDMI outputs exclusive for both of an audio signal and a video signal can be further improved. According to the present invention, even when the calculated value of CTS obtained using a first video clock signal Vc1 generated by a decoder 204 is other than an integer, a value of a second video clock signal Vc2 and an N value are set such that the calculated value of CTS obtained using the second video clock signal Vc2 is an integer. By using the value of second video clock signal Vc2 and the N value set in this manner, an audio reproducing apparatus 103 can generate an audio clock signal Ac having reduced jitter.

9 Claims, 5 Drawing Sheets

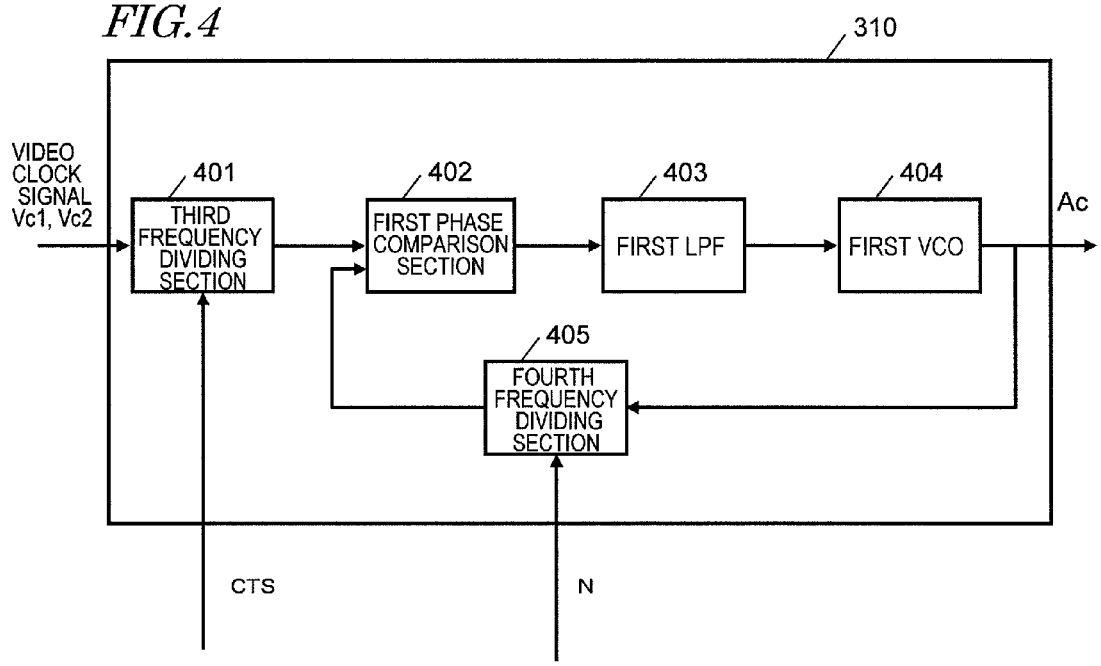
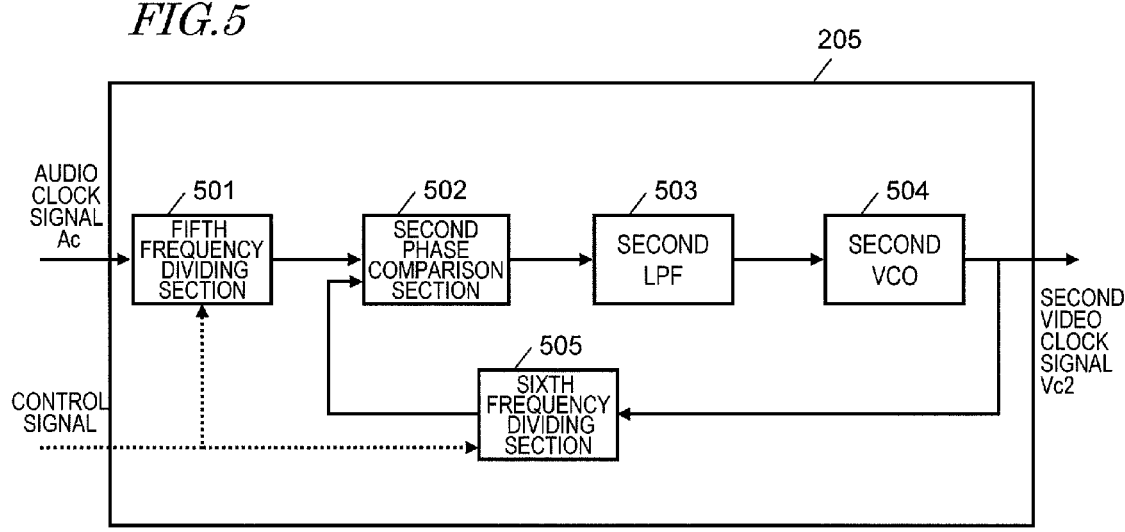

REPRODUCING APPARATUS

BACKGROUND OF THE INVENTION

1. Field of the Invention

The present invention relates to sound quality improvement for an apparatus using a digital interface for audio and video data such as the HDMI (High Definition Multimedia Interface) or the like.

2. Description of the Related Art

Conventionally, the HDMI is widely used as an interface capable of transferring digital video and audio signals while protecting the copyright thereof. Especially for BD-ROM and the like, high-bit-rate multi-channel audio signals are adopted. As a result, conventional audio interfaces using coaxial optical cables cannot transfer such data because of capacity shortage. In order to transfer audio information at a high bit rate, the HDMI is the only available means. In accordance with this, the sound quality of the HDMI has been a recent problem to be solved. It is known that when a digital audio signal is used, the sound quality is deteriorated due to audio clock jitter. According to the HDMI, an audio clock is not directly transferred; instead, all the video and audio information is transferred in synchronization with a video clock. At the same time, two parameters (N value and CTS value) representing the frequency ratio of the audio clock and the video clock are transferred, and the apparatus receiving the signals reproduces the audio clock by PLL based on the information. Due to such a structure, jitter caused by the PLL is one reason for the deterioration of the sound quality. Recently, a method of controlling the parameter N such that the clock is reproduced by the PLL with low jitter has been introduced (see Japanese Laid-Open Patent Publication No. 2009-105889).

A recently known apparatus developed for preventing the deterioration of the sound quality as much as possible and improving the sound quality has two HDMI output ports which are respectively used exclusively for video signals and used exclusively for audio signals. At the output used exclusively for audio signals, the video signals are made completely black, so that the video signals are preventing from disturbing the audio signals in the audio signal receiving apparatus.

SUMMARY OF THE INVENTION

However, even the apparatus having HDMI outputs exclusive for audio signals and exclusive for video signals or the method of controlling the parameter N described above does not provide a sufficient level of performance of suppressing jitter. A further improvement in terms of jitter is now required.

The present invention provides further improvement in the sound quality in an apparatus having HDMI outputs.

A reproducing apparatus according to the present invention includes a decoder for decoding contents to output a first video signal, a first video clock signal, an audio signal and an audio clock signal; a generation section for generating a second video signal and a second video clock signal based on the audio clock signal; and an output section for outputting the audio signal, the second video signal and the second video clock signal but not for outputting the audio clock signal. When the audio signal is output to an audio reproducing apparatus via the output section, a vertical frequency of the first video signal and a vertical frequency of the second video signal are different from each other; and where a frequency of the second video clock signal is Vcf2 and a frequency of the audio clock signal is Acf, $CTS_2$ and $N_2$, which are parameters representing the frequency ratio of the second video clock signal and the audio clock signal, are represented by:

$$CTS_2 = Vcf2/Acf \times N_2; \text{ and}$$

values of Vcf2 and $N_2$ are set such that a calculated value of $CTS_2$ is an integer.

In an embodiment, where a frequency of the first video clock signal is Vcf1, $CTS_1$ and $N_1$, which are parameters representing the frequency ratio of the first video clock signal and the audio clock signal, are represented by:

$$CTS_1 = Vcf1/Acf \times N_1; \text{ and}$$

values of Vcf2 and $N_2$ are set such that $N_1 > N_2$ is fulfilled.

In an embodiment, a calculated value of $CTS_1$ is other than an integer.

In an embodiment, the reproducing apparatus receives, from the audio reproducing apparatus, information on a format of a video signal receivable by the audio reproducing apparatus; and the values of Vcf2 and $N_2$ are set such that the format is fulfilled and a least common multiple of $N_2$ and $CTS_2$ is minimum.

In an embodiment, the reproducing apparatus further includes another output section for outputting the first video signal, the first video clock signal and the audio signal but not for outputting the audio clock signal. The first video signal is output to a video reproducing apparatus via the another output section.

In an embodiment, a frequency of the first video clock signal and the frequency of the second video clock signal are different from each other.

In an embodiment, the vertical frequency of the second video signal is 50 Hz.

In an embodiment, the vertical frequency of the first video signal is 59.94 Hz.

According to the present invention, even when a calculated value of CTS obtained using the first video clock signal generated by the decoder is other than an integer, a reproduced audio clock signal with reduced jitter can be generated by setting a second video clock signal and an N value such that the calculated value of CTS obtained using the second video clock signal is an integer. As seen from this, according to the present invention, the sound reproduced by an audio reproducing apparatus connected to the reproducing apparatus can be of a higher quality.

BRIEF DESCRIPTION OF THE DRAWINGS

FIG. 4 shows a PLL included in the receiving apparatus in the embodiment of the present invention.

FIG. 5 shows a PLL included in the reproducing apparatus in the embodiment of the present invention.

DETAILED DESCRIPTION OF PREFERRED EMBODIMENTS

Hereinafter, a reproducing apparatus in an embodiment according to the present invention will be described. A reproducing apparatus in this embodiment can be industrially produced based on an internal structural view shown in FIG. 2.

Figure 1:
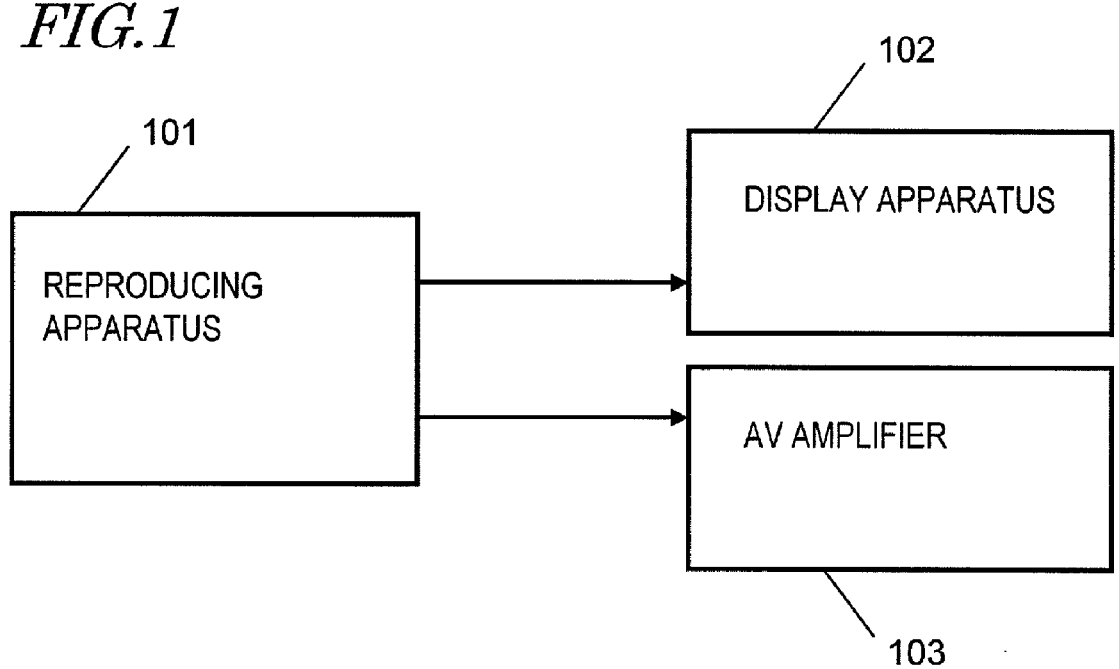
FIG. 1 shows a system structure in an embodiment of the present invention.

FIG. 1 shows a system structure in the embodiment of the present invention. A reproducing apparatus 101 has two HDMI output terminals. The output terminals are respectively connected to a display apparatus 102 and an AV amplifier 103 via HDMI cables. The display apparatus 102 is a video reproducing apparatus for displaying a video based on a video signal among signals which are output from the reproducing apparatus 101. The AV amplifier 103 is an audio reproducing apparatus for outputting an audio signal among the signals which are output from the reproducing apparatus 101 to a speaker or the like. The AV amplifier 103 may have a built-in speaker. The display apparatus 102 and the AV amplifier 103 may be provided as one integrated product. The reproducing apparatus 101 may be referred to as a "transmission apparatus", and the display apparatus 102 and the AV amplifier 103 may be referred to as a "receiving apparatus".

Figure 2:
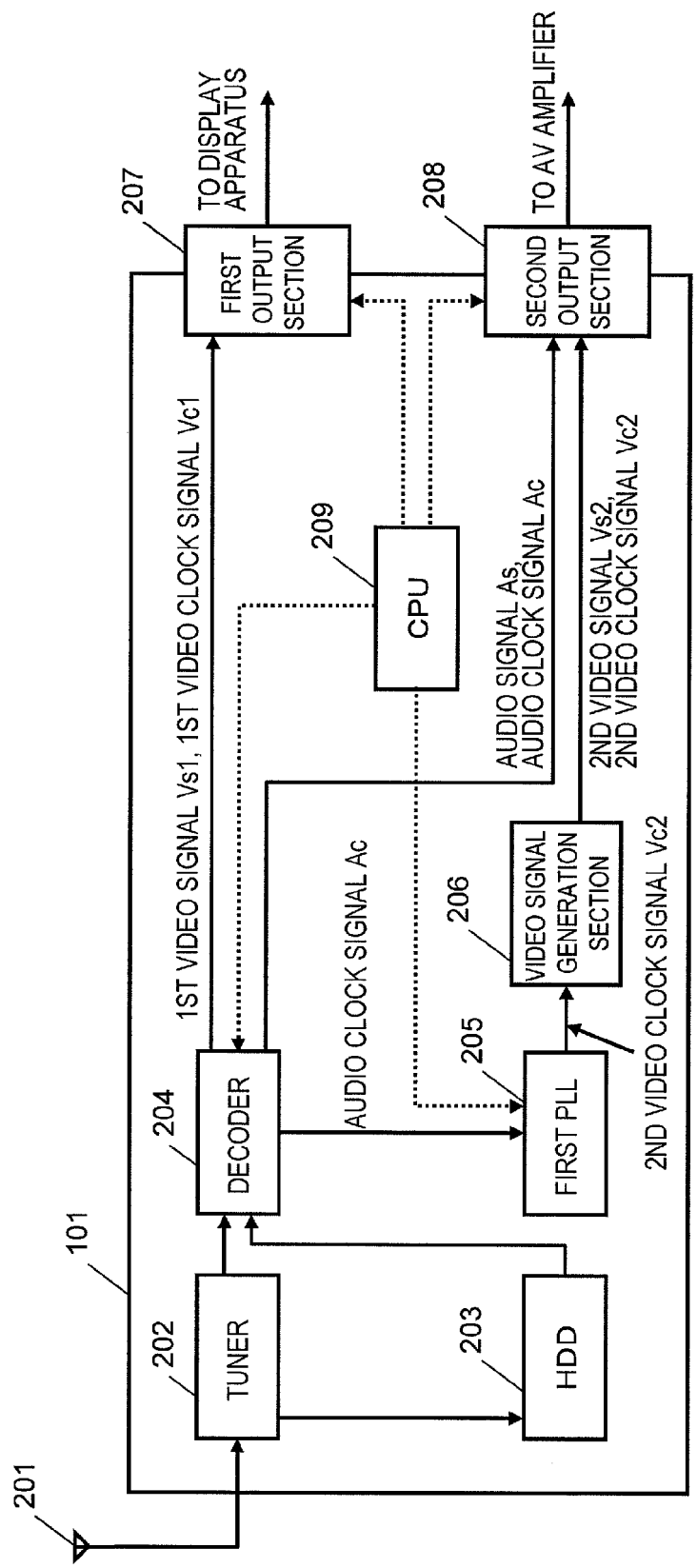
FIG. 2 shows a reproducing apparatus in the embodiment of the present invention.

FIG. 2 shows the reproducing apparatus 101. An antenna 201 receives radio waves transmitted from a broadcast station (not shown). In the broadcast waves, a video signal is compressed by the MPEG2 format (ITU-T standard H.262/ISO/IEC13818-2), and an audio signal sampled at a frequency of 32 kHz, 44.1 kHz or 48 kHz is compressed to be modulated.

A tuner 202 extracts and demodulates desired radio waves among the radio waves transmitted from the antenna 201 and outputs the demodulated radio waves as an MPEG2-format bit-stream data signal or a compressed audio bit-stream data signal. A hard disc 203 records the output from the tuner 202. The hard disc 203 also reproduces the recorded data by reading the data. A decoder 204 decodes and reproduces the MPEG2 signal or the compressed audio signal transmitted from the tuner 202 or the hard disc 203, and outputs a video signal Vs, an audio signal As, a first video clock signal Vc1, and an audio clock signal Ac. A first PLL 205 uses the audio clock signal Ac output from the decoder 204 as an input and generates a second video clock signal Vc2.

A video signal generation section 206 uses the second video clock signal Vc2 output from the first PLL 205 as an input and generates a second video signal Vs2. The video signal generation section 206 outputs the second video clock signal Vc2 and the second video signal Vs2. The second video signal Vs2 generated by the video signal generation section 206 is a video formed only of, for example, black. Thus, the first PLL 205 and the video signal generation section 206 act as a generation section for generating the second video clock signal Vc2 and the second video signal Vs2 based on the audio clock signal Ac.

A first output section 207 outputs the first video signal Vs1 and the first video clock signal Vc1 to the display apparatus 102. The first output section 207 adopts a structure in conformity to the HDMI standards, and so also outputs an audio signal. The audio signal output from the first output section 207 is not to be reproduced by the display apparatus but is transmitted together with a video signal in conformity to the HDMI standards. Therefore, the audio signal may be of any format, and may be, for example, the audio signal As or a silent signal.

A second output section 208 outputs the second video signal Vs2, the second video clock signal Vc2 and the audio signal As to the AV amplifier 103. The second output section 208 adopts a structure in conformity to the HDMI standards. In conformity to the HDMI standards, the second output section 208 does not output an audio clock signal. Similarly, the first output section 207 does not output an audio clock signal, either.

A CPU 209 controls the first output section 207, the second output section 208 and the first PLL 205 in accordance with the video signal and the audio signal reproduced by the decoder 204. Specifically, the CPU 209 determines the N value described later in accordance with the video signal and the audio signal reproduced by the decoder 204, transmits the N value to the first output section 207 and the second output section 208, and controls the first PLL 205 in accordance with the frequency of the audio clock signal Ac also described later.

Figure 3:
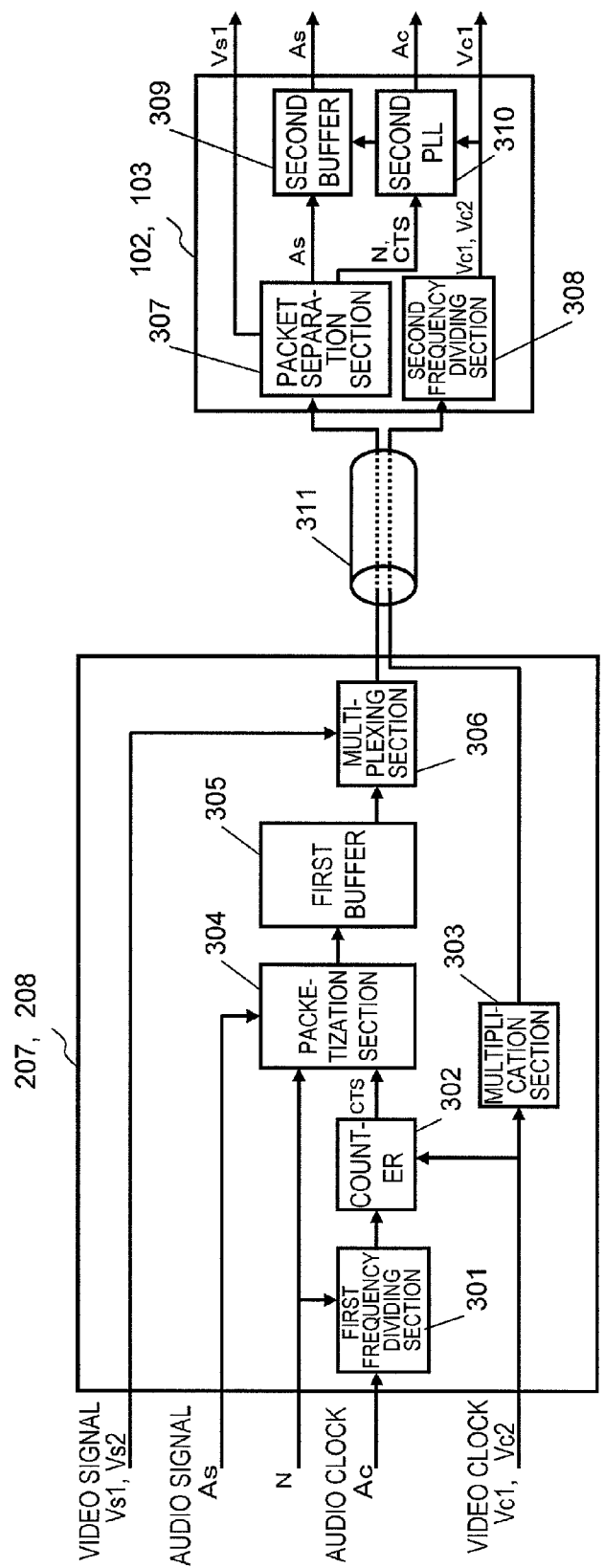
FIG. 3 shows an output section of the reproducing apparatus and a receiving section of a receiving apparatus in the embodiment of the present invention.

FIG. 3 shows a receiving section of the first output section 207 (FIG. 2) and a receiving section of the display apparatus 102 (FIG. 1). Referring to FIG. 3, a first frequency divider section 301 divides the frequency of the input audio clock signal Ac by the N value, which is another input, and outputs the resultant audio clock signal Ac. Specifically, the first frequency divider section 301 divides the frequency of the input audio clock signal Ac into 1/N and outputs the resultant audio clock signal Ac. The N value is a parameter which is set by the CPU 209 and represents the frequency dividing ratio.

A counter 302 counts the frequency, divided into 1/N, of the audio clock signal Ac which is output from the first frequency divider section 301, using the video clock signal Vc1, which is another input. The counter 302 outputs the counting result as a CTS (Cycle Time Stamp) value. The CTS value output from the counter 302 indicates how many clocks of the video signal are included (how many cycles are included) in one clock cycle of the audio clock signal Ac obtained as a result of the frequency division.

A multiplication section 303 multiplies the input video clock signal Vc1 so that the input video clock signal Vc1 has a frequency 10 times higher. The video clock signal Vc1 obtained by the multiplication is output to the display apparatus 102. A packetization section 304 packetizes the input audio signal As, N value and CTS value. A first buffer 305 accumulates the outputs from the packetization section 304. A multiplexing section 306 converts the video signal Vs1 and the packets accumulated in the first buffer 305 into a signal suitable for transfer, and transmits the resultant signal.

A packet separation section 307 separates the signal transmitted from the first output section 207 into the video signal Vs1, the audio signal As, the N value and the CTS value. A second frequency divider section 308 divides the frequency of the video clock signal obtained by the multiplication by 10 and generates the video clock signal Vc1. A second buffer 309 temporarily accumulates the audio signal As obtained by the separation performed by the packet separation section 307 and also outputs the audio signal As in accordance with the control performed by a second PLL 310 described later. The second PLL 310 generates the audio clock signal Ac from the video clock signal Vc1 output from the second frequency divider section 308 and the N value and the CTS value obtained from the packet separation section 307. A cable 311 is an HDMI cable for connecting the first output section 207 and the display apparatus 102.

The receiving sections of the second output section 208 and the AV amplifier 103 respectively have the same structures as shown in FIG. 3. In the case of these sections, signal processing is performed on the video signal Vs2 and the video clock signal Vc2 instead of the video signal Vs1 and the video clock signal Vc1. A specific signal processing method is the same as that described above with reference to FIG. 3 and will not be repeated here.

FIG. 4 shows the second PLL 310 (FIG. 3). When the receiving apparatus receives outputs from the first output section 207, the first video clock signal Vc1 is input to a third frequency divider section 401. When the receiving apparatus receives outputs from the second output section 208, the second video clock signal Vc2 is input to the third frequency divider section 401. Here, a case where the first video clock signal Vc1 is input to the third frequency divider section 401 will be described. When the second video clock signal Vc2 is input to the third frequency divider section 401, substantially the same processing is performed.

Referring to FIG. 4, the third frequency divider section 401 divides the frequency of the first video clock signal Vc1 by the CTS value. A first phase comparison section 402 compares a phase of the output from the third frequency divider section 401 and a phase of an output from a fourth frequency divider section 405. When there is no phase shift, the first phase comparison section 402 outputs value 0. When there is a phase shift, the first phase comparison section 402 outputs a value corresponding to the phase shift. A first LPF 403 passes only a low frequency component of the output from the first phase comparison section 402. The first LPF 403 passes, for example, only a signal having a frequency of 100 Hz or less. A first VCO 404 is an oscillation section, the frequency of which is changed by the output from the first LPF 403. The first VCO 404 is a variable frequency oscillator, the frequency of which is changed in accordance with the value of the output from the first LPF 403, and outputs the audio clock signal Ac. The fourth frequency divider section 405 divides the frequency of the output from the first VCO 404 by N, and outputs the resultant signal to the first phase comparison section 402.

FIG. 5 shows the first PLL 205 (FIG. 2). Referring to FIG. 5, a fifth frequency divider section 501 divides the frequency of the audio clock signal Ac by a first frequency dividing ratio which is set by a control signal, and outputs the resultant signal to a second phase comparison section 502. The second phase comparison section 502 compares a phase of the output from the fifth frequency divider section 501 and a phase of an output from a sixth frequency divider section 505. When there is no phase shift, the second phase comparison section 502 outputs value 0. When there is a phase shift, the second phase comparison section 502 outputs a value corresponding to the phase shift.

A second LPF 503 passes only a low frequency component of the output from the second phase comparison section 502. The second LPF 503 passes, for example, only a signal having a frequency of 100 Hz or less. A second VCO 504 is a variable frequency oscillator, the oscillation frequency of which is changed in accordance with the value of the output from the second LPF 503, and oscillates the second video clock signal Vc2. The sixth frequency divider section 505 divides the frequency of the output from the second VCO 504 by a second frequency dividing ratio which is set by the control signal, and outputs the resultant signal to the second phase comparison section 502.

The first output section 207 and the second output section 208 receive different signals as inputs, but have the same structure. Namely, the video signal input to the first output section 207 is the first video signal Vs1, whereas the video signal input to the second output section 208 is the second video signal Vs2. The video clock input to the first output section 207 is the first video clock signal Vc1, whereas the video clock input to the second output section 208 is the second video clock signal Vc2. The first output section 207 and the second output section 208 receive different signals as inputs but perform the same operation after the signals are input, and so a detailed description on the operation of the second output section 208 will be omitted.

An operation of the video and audio reproducing apparatus in this embodiment having the above-described structure will be further described hereinafter. First, with reference to FIG. 3, a method for transferring video and audio signals by the HDMI standards will be described. The first video signal Vs1 is a signal in which each of RGB signals or each of Y, Cb and Cr signals is of 8 bits. The RGB signals or the Y, Cb and Cr signals of the first video signal Vs1 are each converted into a 10-bit signal suitable for modulation by the multiplexing section 306 and subjected to parallel-serial conversion. Then, the RGB signals or the Y, Cb and Cr signals of the first video signal Vs1 are each transferred to the cable 311 by a clock, having a frequency multiplied to be 10 times higher than that of the first video clock signal Vc1, in synchronization with one another.

The audio signal As is packetized by the packetization section 304 and is once accumulated in the first buffer 305. The audio signal As accumulated in the first buffer 305 is time-division-multiplexed by the multiplexing section 306 in a video signal blanking period. An 8-bit signal of the audio signal As is converted into a 10-bit signal like the video signal, subjected to parallel-serial conversion and transferred via the cable 311.

The video clock signal Vc1 is multiplied by 10 by the multiplication section 303 and transferred via the cable 311. The HDMI standards provide no signal line for directly transmitting an audio clock, and instead, have a mechanism by which a clock having a frequency equal to that of the original audio clock using the second PLL 310 is generated by the receiving apparatus. Therefore, two values representing the frequency ratio of the input video signal and audio signal are defined, which are respectively referred to as the "N value" and the "CTS value".

Where the frequency of the video clock signal is Vcf and the frequency of the audio clock signal is Acf, the N value and the CTS value are represented by:

$$CTS = Vcf/Acf \times N \qquad \text{(expression 1)}.$$

This expression represents the relationship between the video clock signal and the audio clock signal. Here, more precisely, the video clock means a video pixel clock, and the audio clock means a clock having a frequency 128 times higher than the audio sampling frequency. The range of values that the N value can take is defined by the standards as represented by expression (2).

$$Acf/1500\ Hz \leq N \leq Acf/300\ Hz \qquad \text{(expression 2)}$$

The CPU 209 (FIG. 2) sets the N value in accordance with the formats of the video signal and the audio signal which are to be output respectively to the first output section 207 and the second output section 208.

Referring to FIG. 3, the first frequency divider section 301 divides the frequency of the audio clock by a given N value and transmits the resultant audio clock to the counter 302. The counter 302 determines the CTS value by counting the frequency of the output from the first frequency divider section 301 by the video clock signal Vs1. The CTS value and the N value are transmitted to the packetization section 304 to be packetized like the audio signal As, and transmitted to the display apparatus 102 via the cable 311. The N value and the CTS value transmitted via the cable 311 are transmitted to the second PLL 310. From the N value, the CTS value and the first video clock signal Vc1, the audio clock signal Ac can be reproduced.

Now, with reference to FIG. 4, reproduction of the audio clock signal Ac will be described. The frequency of the video clock signal multiplied by 10 by the multiplication section 303 (FIG. 3) is divided by 10 by the second frequency divider section 308 (FIG. 3) to be equal to the frequency of the original video clock signal (the first video clock signal Vc1). The resultant video clock signal is input to the third frequency divider section 401 shown in FIG. 4. The CTS value transmitted as being packetized is extracted from the packet by the packet separation section 307, and is transmitted to the third frequency divider section 401. The third frequency divider section 401 outputs a clock obtained by dividing the frequency of the first video clock signal Vc1 by the CTS value.

Referring to FIG. 4, the first VCO 404 generates an audio clock signal to be used by the receiving apparatus. The frequency of this audio clock signal is divided by N by the fourth frequency divider section 405 and is transmitted to the first phase comparison section 402. The third frequency divider section 401 divides the frequency of the first video clock signal Vc1 by the CTS value. Therefore, for example, where Vs1=74.25 MHz and the CTS value is 74250, the output from the third frequency divider section 401 is a clock having a frequency of 1 kHz. The first VCO 404 is a variable frequency oscillator. Where the oscillation frequency of the first VCO 404 is 32 kHz multiplied by 128, namely, 4096 kHz and the N value is 204096, the output from the first VCO 404 is a clock having a frequency of 1 kHz. The first phase comparison section 402 compares the phase of the output from the third frequency divider section 401 and the phase of the output from the fourth frequency divider section 406. When there is no phase shift, the first phase comparison section 402 outputs value 0. When there is a phase shift, the first phase comparison section 402 outputs a phase error signal in accordance with the magnitude of the phase shift. The first phase comparison section 402 performs a phase comparison operation in accordance with the frequencies of the input signals, and so the output from the first phase comparison section 402 includes many frequency components of the input signals, namely, many components of 10 kHz. Such an output is not appropriate to control the first VCO 404. Therefore, the first LPF 403 removes high frequency components and extracts only low frequency components, and thus the oscillation frequency of the first VCO 404 is controlled. The first phase comparison section 402, the first LPF 403, the first VCO 404 and the fourth frequency divider section 405 form a control loop. The oscillation frequency of the first VCO 404 is controlled such that the output from the first phase comparison section 402 is made 0 by the control loop.

Namely, the second PLL 310 generates the correct audio clock signal Ac based on the first video clock signal Vc1. Namely, the first phase comparison section 402 compares the phase of a clock obtained by dividing the frequency of the video clock by the CTS value and the phase of a clock obtained by dividing the frequency of the generated audio clock by the N value, and the low frequency components of the resultant signal are transmitted via the LPF 403 and controls the first VCO 404 such that:

the video clock signal frequency/CTS value=reproduced audio clock signal frequency/N value.

As a result, an audio clock having a frequency equal to that of the audio clock on the transmission apparatus side is reproduced on the receiving apparatus side. An issue at this point is jitter (time fluctuation) of the reproduced audio clock signal Ac. The jitter influences the final sound quality. Namely, it is important that control should be done so as to reduce the fluctuation.

The relationship between the N value and the CTS value is determined by the frequency ratio of the audio clock and the video clock. Therefore, the N value and the CTS value are in proportion to each other with the same audio and video formats. When one of the N value and the CTS value is decreased, the other is also decreased. These values also determine the operating frequency of the first phase comparison section 402. Namely, when the N value and the CTS value are decreased, the phase comparison cycle of the first phase comparison section 402 is shortened. When the phase comparison cycle is shortened, the reaction to the phase error is made quicker. Therefore, smaller N value and CTS value are advantageous to reduce the jitter of the reproduced audio clock signal.

The N value can be given as a value immediately, whereas the CTS value is generated by the counter 302 (FIG. 3). When the N value is decreased, the CTS value may possibly has a component at a decimal place smaller than an integer. Even when the CTS value has a component at a decimal place according to calculation, the CTS value actually output by the counter 302 is a counted value and so is an integer. In this case, each time the counter 302 counts, the CTS value actually output is changed. In such a situation, each time the CTS value is changed, the frequency of the reproduced audio clock generated by the second PLL 310 is changed. As a result, the jitter is increased.

Accordingly, in order to keep the jitter of the reproduced audio clock at a minimum level, the N value and the CTS value need to be minimum and also an integer.

Where the clock frequency of the second video clock signal Vc2 is Vcf2 and the clock frequency of the audio clock signal Ac is Acf, $CTS_2$ and $N_2$, which are parameters representing the frequency ratio of the second video clock signal Vc2 and the audio clock signal Ac are represented by:

$$CTS_2 = Vcf2/Acf \times N_2 \quad \text{(expression 3)}.$$

The values of Vcf2 and $N_2$ need to be set such that the calculated value of $CTS_2$ obtained from expression 3 is an integer. For example, the CPU 209 (FIG. 2) searches for a combination of Vcf2 and $N_2$ with which the calculated value of $CTS_2$ is an integer, and thus sets the values of Vcf2 and $N_2$. Then, the CPU 209 outputs a control signal including the value of $N_2$ to the first PLL 205. In accordance with the control signal from the CPU 209, the first PLL 205 outputs the second video clock signal Vc2 having the frequency Vcf2 set by the CPU 209.

The second output section 208 generates $CTS_2$ having a value matching the calculated value using the second video clock signal Vc2 and the $N_2$ value as above, and outputs the obtained values to the AV amplifier 103 via the cable 311. The AV amplifier 103 can generate the reproduced audio clock signal Ac having reduced jitter by using the received values.

Where the clock frequency of the first video clock signal Vc1 generated by the decoder 204 is Vcf1, $CTS_1$ and $N_1$, which are parameters representing the frequency ratio of the first video clock signal Vc1 and the audio clock signal Ac are represented by:

$$CTS_1 = Vcf1/Acf \times N_1 \quad \text{(expression 4)}.$$

Even when the calculated value of $CTS_1$ obtained using the first video clock signal Vc1 generated by the decoder 204 is other than an integer, the AV amplifier 103 can generate the reproduced audio clock signal Ac having reduced jitter by setting the values of Vcf2 and $N_2$ such that the calculated value of $CTS_2$ is an integer. The jitter is more likely to be reduced when the value of $N_2$ used by the AV amplifier 103 is smaller. Therefore, the CPU 209 sets the value of $N_2$ such that $N_1 > N_2$ is fulfilled.

The values of $CTS_2$ and $N_2$ can be set to be as small as possible as follows, for example. The CPU 209 searches for combinations of $N_2$ and Vcf2 sequentially from the combination including the minimum possible value of $N_2$. Thus, the minimum value of $N_2$ with which the calculated value of $CTS_2$ is minimum can be specified. In other words, the values of Vcf2 and $N_2$ can be set such that the least common multiple of $N_2$ and $CTS_2$ is minimum. Alternatively, the reproducing apparatus 101 may hold the values of Vcf2 and $N_2$ corresponding to various video and audio formats in the form of a table in advance. In this case, the CPU 209 can refer to the table to set appropriate values of Vcf2 and $N_2$.

For example, as described later, for generating a video signal having a 50 Hz-system vertical synchronization signal as the second video signal Vs2, the clock frequency Acf of the audio clock signal Ac is one of three, i.e., 4096 kHz, 5644.8 kHz and 6144 kHz (sampling frequency: 32 kHz, 44.1 kHz, 48 kHz). In this case, the minimum of values of $N_2$ with which the calculated value of $CTS_2$ is an integer may be found in advance for each of the three values of Acf and put into a table. Thus, the CPU 209 can specify the minimum value of $N_2$ with which the calculated value of $CTS_2$ is as small as possible by selecting the value of $N_2$ associated with the reproduced audio clock signal Ac.

Figure 6:
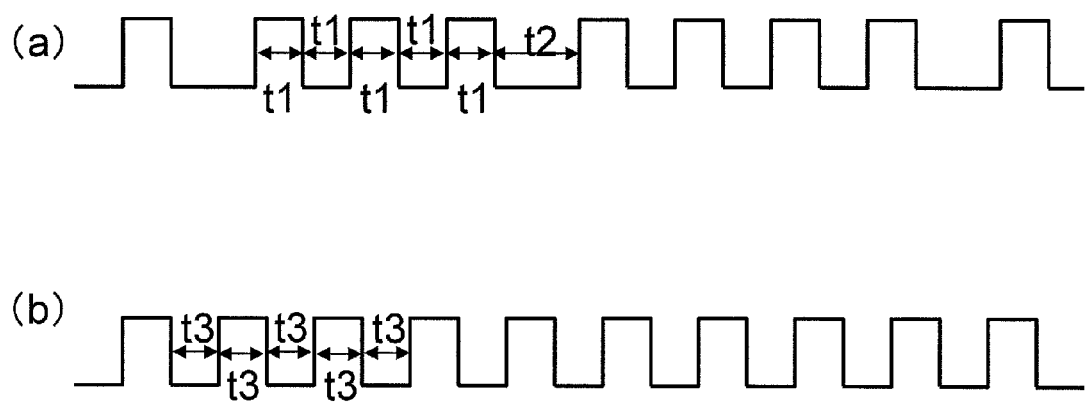
FIGS. 6(a) and 6(b) each show an example of a reproduced audio clock in the embodiment of the present invention.

FIG. 6(a) shows a reproduced audio clock signal Ac in the case where the value of CTS has a component at a decimal place according to calculation and is changed each time the value is counted. By contrast, FIG. 6(b) shows a reproduced audio clock signal Ac in the case where the value of CTS is an integer according to calculation and is not changed. In FIG. 6(a), clock cycles of t1 and t2 are both present. By contrast, in FIG. 6(b), the clock cycle is constant at t3.

Now, the video and audio clock frequencies used in examples of the present invention will be described. A video signal and an audio signal transferred by HDMI are defined by the EIA/CEA-861 standard and various industrial standards referred to by the EIA/CEA-861 standard. The vertical synchronization signal of a video signal is of the 60/1.001 Hz system (hereinafter, referred to as the "59.94 Hz system") or of the 50 Hz system. These vertical synchronization signals are different in pixel clock. The 59.94 Hz-system signal is mainly used in the former NTSC broadcast zone including Japan and the U.S., and the 50 Hz-system signal is used in the former PAL broadcast zone including Europe. Along with the introduction of BD-ROM into the market, a video signal standard based on the movie films recorded by 24 frames per second has appeared. A video signal of this standard is actually put into practice as having a vertical synchronization frequency of 24/1.001 Hz in order to comply with ⅖ of the 59.94 Hz-system vertical synchronization signal.

The pixel clock in each format is as shown in Table 1.

TABLE 1

| Vertical synchronization frequency | Video format | Pixel clock |
|---|---|---|
| 59.94 Hz | 480P | 27 MHz |
| (60/1.001 Hz) | 720p/1080i | 74.25/1.001 MHz |
| | 1080p | 148.5/1.001 MHz |
| 50 Hz | 576P | 27 MHz |
| | 720p/1080i | 74.25 MHz |
| | 1080p | 148.5 MHz |
| 24/1.001 Hz | 1080p | 74.25/1.001 |

The sampling frequency of the audio signal is either one of 32 kHz, 44.1 kHz and 48 kHz. These are not different zone by zone and are used commonly in the world.

As an example, a combination of a CTS value and an N value will be described by comparing the 59.94 Hz-system vertical synchronization frequency and the 50 Hz-system vertical synchronization frequency at a resolution of 1080i. In general, for a video signal handled by the 59.94 Hz (NTSC) system, the correct vertical synchronization frequency is represented as 60*1000/1001 as described above, and the video clock used in this case is 74.25/1.001 MHz. In the case where the audio clock is 32 kHz, even when the N value=11648, the CTS value=210937.5. The CTS value is not an integer.

By contrast, for the 50 Hz (PAL) system, the vertical frequency is also 50 Hz. The video clock used in this case is 74.25 MHz. In the case where the audio clock is 32 kHz, the minimum N value and CTS value are as follows.

N value=4096;CTS value=74250

Accordingly, the jitter of the reproduced audio clock signal can be lower when the video signal is transferred with the 50 Hz system than with the 59.94 Hz system.

Expression 1 mentioned above can also be represented as:

CTS value=(video clock frequency×N value)/audio clock frequency.

This can be deformed as:

CTS value/N value=video clock frequency/audio clock frequency  (expression 5).

As seen from the settings that video clock=pixel clock and audio clock=clock having a frequency 128 times higher than the audio sampling frequency, the ratio of CTS and N shows the relationship of the pixel clock and the audio sampling clock. Accordingly, as the ratio of the audio sampling clock with respect to the pixel clock is closer to an integer, a combination of N and CTS at which N and CTS are smaller integer values can be selected. Comparing 1080i/720p/1080p of the 59.94 Hz and 24/1.001 Hz systems against 1080i/720p/1080p of the 50 Hz system in Table 1, the pixel clock is 1/1.001 times higher in the 59.94 Hz and 24/1.001 Hz systems than in the 50 Hz system. Therefore, a combination of N and CTS at which N and CTS are smaller integer values can be selected with the 50 Hz system than with the 59.94 Hz and 24/1.001 Hz systems.

Hence, in general also, the jitter of a reproduced audio clock can be reduced when the video signal is transferred with the 50 Hz system than with the 59.94 Hz system. Accordingly, in this embodiment, even when the video signal decoded by the decoder 204 is of the 59.94 Hz (NTSC) system, the vertical frequency of the video signal output from the second output section 208 is set to 50 Hz.

Referring to FIG. 2, the output from the decoder 204 includes a video signal and an audio signal. Here, a case where the video signal is a 1080i video signal having a vertical synchronization signal frequency of the 59.94 Hz system, the video clock is 74.25/1.001MEz, and the audio signal is a linear PCT signal sampled at 32 kHz will be described as an example.

The second output section 208 is connected to the AV amplifier 103, and so only needs to output an audio signal. However, according to the HDMI standards, it is required to transfer an audio packet on the clock of the video signal and the synchronization signal. Therefore, a video signal also needs to be transmitted at the same time. According to the HDMI standards, a mechanism of presenting the transmission apparatus with a video format receivable by the receiving apparatus is incorporated by EDID. Owing to this, the tuner 202 can detect the video signal format receivable by the AV amplifier 103 connected to the second output section 208. In addition, the user does not view the video from the AV amplifier 103, but views the video on the display apparatus 102. Therefore, the video signal format transmitted to the AV amplifier 103 via the second output section 208 may be any format which is receivable by the AV amplifier 103.

Accordingly, in the case where it is detected that the AV amplifier 103 can receive a 50 Hz-system video signal, transmitting an audio signal on the 50 Hz video format regardless of the format of the video signal decoded by the decoder 204 is advantageous for reducing the jitter of the audio clock reproduced by the AV amplifier 103 and thus improving the sound quality. Therefore, in this embodiment, referring to FIG. 2, the first PLL 205 newly generates the second video clock signal Vc2 having a frequency of 74.25 Hz from the audio clock decoded by the decoder 204.

Referring to FIG. 5, the fifth frequency divider section 501 divides the frequency of the audio clock signal Ac by the first frequency dividing ratio which is set by the control signal. For example, in the case of an audio signal sampled at a frequency of 32 kHz, a clock signal of 4096 kHz, which is 128 times higher than the sampling frequency, is input. When the first frequency dividing ratio is set to 4096 for the fifth frequency divider section 501 by the control signal, the output from the fifth frequency divider section 501 is a clock having a frequency of 1 kHz.

The second VCO 504 is a variable frequency oscillator, and outputs the second video clock signal Vc2 having an oscillation frequency of 74.25 MHz. For the sixth frequency divider section 505, the second frequency dividing ratio is set to 74250 by the control signal. The output from the sixth frequency divider section 505 is a clock having a frequency of 1 kHz.

The second phase comparison section 502 compares the phase of the output from the fifth frequency divider section 501 and the phase of the output from the sixth frequency divider section 505. When there is no phase shift, the second phase comparison section 502 outputs value 0 as a phase shift signal. When there is a phase shift, the second phase comparison section 502 outputs a phase error signal in accordance with the magnitude of the phase shift. The second phase comparison section 502 performs a phase comparison operation in accordance with the frequencies of the input signals, and so the output from the second phase comparison section 502 includes many frequency components of the input signals, namely, many components of 10 kHz. Such an output is not appropriate to control the second VCO 504. Therefore, the second LPF 503 removes high frequency components and extracts only low frequency components, and thus the oscillation frequency of the third VCO 504 is controlled. The second phase comparison section 502, the second LPF 503, the second VCO 504 and the sixth frequency divider section 505 form a control loop. The oscillation frequency of the third VCO 504 is controlled such that the output from the second phase comparison section 502 is made 0 by the control loop. Namely, the first PLL 205 generates the correct second video clock signal Vc2 based on the audio clock signal Ac.

The video signal generation section 206 (FIG. 2) generates the second video signal Vs2 having a 50 Hz vertical synchronization signal from the 74.25 MHz output generated by the first PLL 205, and transmits the resultant signal to the second output section 208. The second output section 208 transmits the audio signal As and the control signal on the second PLL 310 (including the CTS value and the N value) superimposed on the second video clock signal Vc2 generated by the first PLL 205 and the second video signal Vs2 generated by the video signal generation section 206.

The first video signal Vs1 and the first video clock signal Vc1 decoded by the decoded 204 are transmitted to the first output section 207. The first output section 207 does not output the audio signal As, and instead, outputs a silent signal to the display apparatus 102.

The CPU 209 shown in FIG. 2 appropriately sets the first frequency dividing ratio and the second frequency dividing ratio for respectively controlling the fifth frequency divider section 501 and the sixth frequency divider section 505 shown in FIG. 5 in accordance with the audio clock signal Ac output from the decoder 204. Owing to this, in the case where the audio sampling frequency is each of 32 kHz, 44.1 kHz and 48 kHz, the frequency of the second video clock signal Vc2 can be correctly 74.25 MHz. The relationship among the audio sampling frequency, the frequency of the audio clock signal Ac, the first frequency dividing ratio and the second frequency dividing ratio by which the frequency of the second video clock signal Vc2 can be correctly 74.25 MHz is shown in Table 2.

TABLE 2

| Audio sampling frequency | Audio clock signal Ac frequency | 1st frequency dividing ratio | 2nd frequency dividing ratio |
|---|---|---|---|
| 32 kHz | 4096 kHz | 4096 | 74250 |
| 44.1 kHz | 5644.8 kHz | 6272 | 82500 |
| 48 kHz | 6144 kHz | 6144 | 74250 |

In the embodiment of the present invention having the above-described structure, as described above, in a video and audio reproducing apparatus for receiving a video signal having a 59.94 Hz-system vertical synchronization frequency and a broadcast audio signal sampled at 32 kHz, 44.1 kHz or 48 kHz, the audio signal is output to the second output section 208 together with a video signal having a 50 Hz vertical synchronization signal instead of the video signal having a 59.94 Hz-system vertical synchronization frequency. Owing to this, an audio signal of a higher sound quality can be transmitted than by outputting the audio signal together with a video signal having a 59.94 Hz vertical synchronization signal.

The reproducing apparatus 101 has an HDMI output exclusive for audio contents and another an HDMI output exclusive for video contents. The present invention is also applicable to an apparatus exclusive for audio signal reproduction, which does not output video contents. In this case, the reproducing apparatus 101 has a structure obtained by excluding the first output section 207 from the above-described structure. Also in the apparatus exclusive for audio signal reproduction, a reproduced audio clock signal with reduced jitter can be generated by setting the second video clock signal Vc2 and the N value such that the calculated value of CTS obtained using the second video clock signal Vc2 is an integer.

The reproducing apparatus 101 in this embodiment includes the decoder 204 capable of outputting a video signal and an audio signal by decoding contents; the first output section 207 for outputting a video signal, a video clock signal and an audio signal but not for outputting an audio clock signal; and the second output section 208 for outputting a video signal, a video clock signal and an audio signal but not for outputting an audio clock signal. The video signal decoded by the decoder 204 is output, via the first output section 207, to the display apparatus 102 connected to the first output section 207. The audio signal decoded by the decoder 204 is output, via the second output section 208, to the audio reproducing apparatus 103 connected to the second output section 208. In this case, the vertical frequency of the video signal decoded by the decoder 204 is different from the vertical frequency of the video signal output from the second output section 208. In addition, the clock frequency of the video signal decoded by the decoder 204 is different from the clock frequency of the video signal output from the second output section 208.

Thus, the sound reproduced by the audio reproducing apparatus 103 connected to the reproducing apparatus 101 can be of a higher quality.

The vertical frequency of the video signal output from the second output section 208 is, for example, 50 Hz.

The second output section 208 includes the first frequency divider section 301 for dividing the clock of the audio signal to be output into 1/N by the frequency dividing ratio N, and the counter 302 for calculating the counted value CTS which indicates how many clocks of the video signal to be output are included in one clock cycle of the audio clock signal having the frequency divided by the first frequency divider section 301. To the AV amplifier 103, the second output section 208 further outputs the frequency dividing ratio N and the counted value CTS. Where the frequency of the clock for reproducing an audio signal is As and the frequency of the clock of a video signal to be output is Vs, As=Vs×N/CTS is fulfilled. The reproducing apparatus 101 has information received from the AV amplifier 103 on the formats of the video signal receivable by the AV amplifier 103. Among the formats of the video signal, the format which minimizes the least common multiple of the frequency dividing ratio and the counted value CTS is used to output the video signal.

The present invention is useful for apparatuses using a digital interface for audio and video signals such as the HDMI (High Definition Multimedia Interface) or the like, and can improve the quality of the sound to be reproduced. Therefore, the present invention is applicable to DVD players, BD players, DVD recorders, BD recorders, HDD recorders and the like.

What is claimed is:

1. A reproducing apparatus, comprising:
a decoder for decoding contents to output a first video signal, a first video clock signal, an audio signal and an audio clock signal;
a generation section for generating a second video signal and a second video clock signal based on the audio clock signal; and
an output section for outputting the audio signal, the second video signal and the second video clock signal but not for outputting the audio clock signal;
wherein:
when the audio signal is output to an audio reproducing apparatus via the output section,
a vertical frequency of the first video signal and a vertical frequency of the second video signal are different from each other; and
where a frequency of the second video clock signal is Vcf2 and a frequency of the audio clock signal is Acf, $CTS_2$ and $N_2$, which are parameters representing the frequency ratio of the second video clock signal and the audio clock signal, are represented by:

$CTS_2 = Vcf2/Acf \times N_2$; and values of Vcf2 and $N_2$ are set such that a calculated value of $CTS_2$ is an integer.

2. The reproducing apparatus of claim 1, wherein where a frequency of the first video clock signal is Vcf1, $CTS_1$ and $N_1$, which are parameters representing the frequency ratio of the first video clock signal and the audio clock signal, are represented by:

$CTS_1 = Vcf1/Acf \times N_1$; and values of Vcf2 and $N_2$ are set such that $N_1 > N_2$ is fulfilled.

3. The reproducing apparatus of claim 2, wherein a calculated value of $CTS_1$ is other than an integer.

4. The reproducing apparatus of claim 1, wherein:
the reproducing apparatus receives, from the audio reproducing apparatus, information on a format of a video signal receivable by the audio reproducing apparatus; and
the values of Vcf2 and $N_2$ are set such that the format is fulfilled and a least common multiple of $N_2$ and $CTS_2$ is minimum.

5. The reproducing apparatus of claim 1, further comprising another output section for outputting the first video signal, the first video clock signal and the audio signal but not for outputting the audio clock signal;
wherein the first video signal is output to a video reproducing apparatus via the another output section.

6. The reproducing apparatus of claim 1, wherein a frequency of the first video clock signal and the frequency of the second video clock signal are different from each other.

7. The reproducing apparatus of claim 1, wherein the vertical frequency of the second video signal is 50 Hz.

8. The reproducing apparatus of claim 7, wherein the vertical frequency of the first video signal is 59.94 Hz.

9. A reproducing apparatus, comprising:
a decoder for decoding contents to output a first video signal, a first video clock signal, an audio signal and an audio clock signal;
a generation section for generating a second video signal and a second video clock signal based on the audio clock signal; and
an output section for outputting the audio signal, the second video signal and the second video clock signal but not for outputting the audio clock signal;
wherein:
when the audio signal is output to an audio reproducing apparatus via the output section,
the vertical frequency of the first video signal is 59.94 Hz, and
the vertical frequency of the second video signal is 50 Hz.

* * * * *